United States Patent Office 3,449,667
Patented June 10, 1969

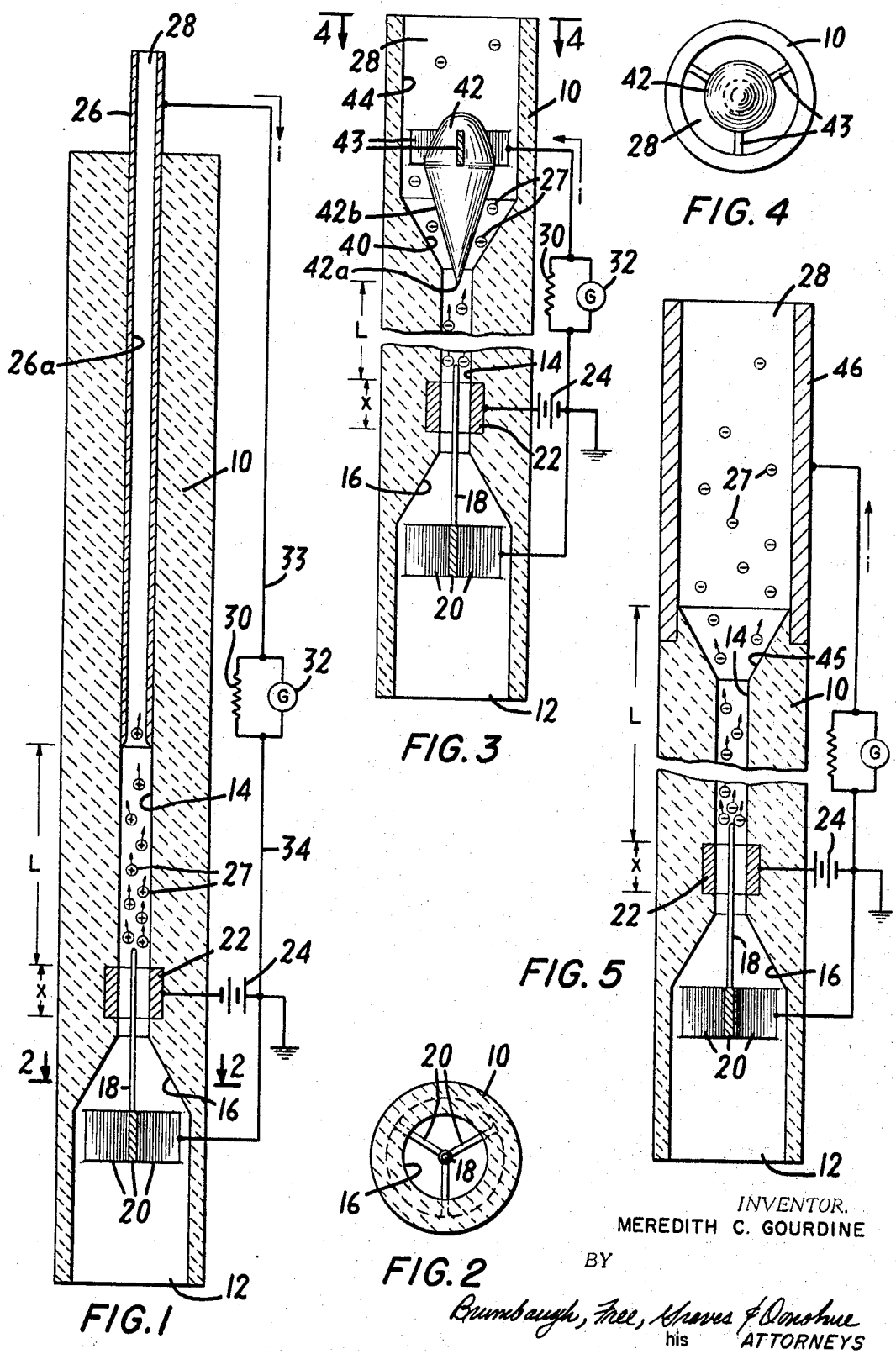

3,449,667
ELECTROGASDYNAMIC METHOD AND APPARATUS FOR DETECTING THE PROPERTIES OF PARTICULATE MATTER ENTRAINED IN GASES
Meredith C. Gourdine, Oakland, N.J., assignor to Gourdine Systems, Incorporated, Livingston, N.J., a corporation of Delaware
Filed May 18, 1966, Ser. No. 551,017
Int. Cl. G01n 27/00, 27/62; G01r 5/28
U.S. Cl. 324—71          30 Claims

ABSTRACT OF THE DISCLOSURE

Electrogasdynamic methods and apparatus for measuring the properties of particles entrained in a gas stream, in which the gas stream is passed down a flow path defined by a dielectric conduit. In the upstream portion of the conduit, the entrained particles are charged by exposure to a corona discharge and carried downstream to a collector section where the particles come into contact with a conductive collector element that is connected to a current indicating circuit. This circuit preferably has an impedance large enough to establish, between the collector section and the corona discharge, an axial electric field having a polarity and magnitude sufficient to prevent the discharge into the collector section of ions that have the same polarity as the charged particles, but which are not attached to or associated with those particles.

---

The present invention relates to improved methods and apparatus for determining the properties of particulate or aerosol matter entrained in a flowing gaseous system. Specifically, the invention deals with improved methods and apparatus of this type employing electrogasdynamic techniques for measuring the concentration, mobility, size and mass flow of such particulate matter.

In one familiar method of detecting the concentration of aerosol particles suspended in a gas, a light beam is passed through the gas and the quantity of light reaching a photoelectric detector is measured. In this method the quantity of light reaching the photodetector is dependent upon the fraction of light either reflected or convected away by the aerosol particles. Instruments employing this method must be provided with a long light beam path in order to attain high sensitivity of detection and are therefore limited to use in applications wherein the gas being monitored is embraced by a relatively large area. Further, such devices or instruments are difficult to calibrate because the accuracy of the indication provided by the photodetector is critically related to the relative proportions of reflected and convected light energy.

In another known method for detecting the density of an aerosol, the rate of electrical charge transported by solid particles suspended in the gas is measured. In known devices using this method, the gas is ionized to charge the suspended particles in a gas stream and as the charged particles travel downstream, they are subjected to an electric field established between a pair of concentric electrodes. When acted upon by the electric field, the charged particles travel to the outer concentric electrode where they are discharged, and the rate of particle discharge is measured and correlated to the particle concentration. In addition to the concentric electrodes, these devices use a special structural configuration designed to trap or impede the flow of molecular ions to the electric field region between the concentric electrodes. Although apparatus of this type offer a substantial improvement over instruments incorporating the light beam detection method, their construction is relatively complex, and they require one or more high voltage supplies each of which must develop several thousand volts to excite the concentric and ionizing electrodes. For the foregoing reasons, such devices have been relatively expensive to produce. An additional disadvantage resides in the fact that charged particles are driven to the flow path boundary due to an externally applied electric field, and any coating which accumulates at the outer concentric collector electrode due to deposition of the particles can ultimately bring about arcing and dielectric breakdown, causing damage to power supplies or the apparatus itself.

It is therefore a primary object of the present invention to provide improved electrogasdynamic methods and apparatus for detecting and monitoring the properties of particulate matter in gases.

A further object of the invention is to provide improved methods and apparatus of this type which overcome the disadvantages of the prior art.

Another object of the invention is to provide new and improved configurations for simplifying the construction and design of aerosol detecting devices.

Briefly, these and other objects of the invention are attained by flowing the fluid containing the suspended particles down a bounded flow path and ionizing the fluid at an upstream portion of the flow path to charge the particles and produce a radial space charge field downstream of the ionization. After ionization, the charged particles are subjected to an axial electric field producing ion slip in the flow path and raising the potential energy of the particles. The charge associated with the particles moving to the boundary of the flow path under the effects of the space charge field downstream of the axial electric field is transferred to, or collected by, a collecting surface to which a current indicating device is connected. The current flowing in the collecting surface which represents this rate of transfer of the charge, may then be correlated to the concentration, mobility, mass flow and size of the entrained particles. The longitudinal distance over which the axial field is applied is related to a parameter associated with the fluid and the charged particles, in a manner to be described fully herein. In a preferred embodiment, the velocity of the stream of fluid in the flow path is decreased prior to collection.

For a better understanding of the invention, together with the further objects, advantages and aspects thereof, reference may be made to the following detailed description and to the drawings, wherein:

FIGURE 1 is a cross-sectional view of a basic form of aerosol monitoring apparatus in accordance with the invention;

FIGURE 2 is a cross-sectional view of the FIGURE 1 apparatus, taken generally along the line 2—2;

FIGURE 3 is a cross-sectional view of another form of the FIGURE 1 apparatus, wherein the charges carried by the particles are neutralized by passage through corona discharge region;

FIGURE 4 is a plan view along the line 4—4 of the apparatus shown in FIGURE 3;

FIGURE 5 is a cross-sectional view showing a further modification of the FIGURE 1 apparatus employing a collector section of larger diameter.

FIGURES 1 and 2 illustrate a basic form of aerosol monitor according to the present invention, wherein the fluid containing the particles to be monitored is passed through an electrogasdynamic channel in which the particles become charged. The apparatus includes a dielectric tube or conduit 10 having an inlet 12 into which the fluid, or gas, is introduced. In general, the interior wall or surface 14 of the dielectric conduit defines the boundary of a flow path for the gas. The upstream portion of the conduit 10 includes a convergent nozzle section 16 for accelerating the gas and for constricting the cross-sectional area of the flow path. Disposed at the center of the nozzle section 16 is a corona discharge electrode 18 extending axially of the conduit 10 and supported by the radially projecting support members 20 affixed to the wall 14 of the conduit. Surrounding the corona electrode 18 near its downstream end is an annular attractor electrode 22.

A low current, high voltage source, represented by the battery 24, is connected between the attractor electrode 22 and the corona electrode 18 to establish between them a corona discharge field for ionizing the fluid passing through this field and charging the aerosol particles. Preferably, the corona electrode 18 is disposed coaxially with the attractor electrode 22 so that the concentration of charge in the corona discharge is nearly uniform across the flow path. Spaced a distance L downstream of the attractor electrode 22 is a cylindrical metal collector electrode 26, the conductive inner surface 26a of which neutralizes the charges 27 on the particles carried downstream by the dynamic forces of the flowing gas, as will be explained shortly in greater detail. At the downstream end of the collector electrode 26 is an outlet 28 which may be connected to a pumping device for imparting a velocity to the gas. Preferably, the collector electrode 26 is slidable axially along the inner wall 14 of the conduit 10 such that the length L between the attractor electrode 22 and the collector electrode 26 can be varied to adapt the device to various measurements in a manner to be described subsequently.

The portion of the dielectric conduit 10 over the length L, exposed to the flow path between the ionizing electrodes 18, 22 and the collector electrode 26 comprises an electrogasdynamic generator section for raising the potential energy of the charged particles such that the collector electrode 26 is maintained at a potential sufficient to maintain current flow through an indicating instrument, depicted by the parallel resistor 30 and indicating galvanometer 32 electrically connected between the collector electrode 26 and the corona electrode 18 by the conductors 33, 34. As illustrated, the corona electrode 18 is connected to ground, but the electrical circuit may be either floating or referenced to another potential if desired.

In brief, the operation of the FIGURE 1 unit is as follows. The aerosol gas containing the suspended particles is flowed through the conduit 10 between the inlet 12 and the outlet 28. In a practical application the apparatus may be situated to receive a portion of the exhaust gas, for example, from an industrial smoke stack. Where the initial velocity of the gas entering the inlet 12 is high, no mechanical pump will be necessary to accelerate the fluid to the desired speed. Where the initial velocity is low, however, or where the subject gas is still, a suitable pump or impeller connected to the inlet 12 or outlet 28 will be required for raising the velocity of the gas. As the gas passes through the corona discharge existing between the attractor electrode 22 and the corona discharge electrode 18 excited by the power supply 24, the aerosol particles attain a charge having a polarity corresponding to the polarity of the charge emitted by the corona electrode 18. In this regard, it should be noted that this charge may be either positive, as shown, or negative, depending upon the polarity of the connections of the power supply 24 to the respective ionizing electrode.

The charged particles 27 are then swept downstream, along with some molecular ions which are also formed in the corona discharge, and induce the radial space charge electric field in the flow path downstream of the ionizing electrodes. For uniform charge concentration in the flow path, the space charge field gradient is linear and increasing in the outward radial direction. This field is therefore maximum at the inner collector surface 26a. Under the influence of the radial space charge field, the ions and charged particles 27 tend to drift toward the boundary of the flow path defined by the wall 14. A small percentage of the charged particles will, of course, find their way to the flow path boundary due to random motion in the fluid stream. The particles reaching the collector electrode 26 at a higher potential energy continue to move toward the flow path boundary where they come into contact with the electrode surface 26a. Upon contact, the particles are discharged into the external circuit including the resistor 30 and indicating galvanometer 32 which indicates the rate ($dq/dt$) at which the collector 26 receives charges from the particles, and therefore indicates the rate at which the particles are discharged or neutralized.

It is noteworthy that because the value of the field influencing radial motion of the charge particles is maximum at the flow path boundary, all or most of the charges are efficiently neutralized. It should moreover be mentioned that because no external electrical field need be provided in the collector 26, there is no tendency of the device to malfunction because of any surface coating formed by particle deposition at the surface 26a.

When current $i$ is established through the external circuit, a potential difference appears between the collector electrode 26 and the attractor electrode 22. This potential difference, acting over the length L, creates an axial electric field which resists the downstream motion of the charged particles and ions formed in the corona discharge. The repulsion forces acting upon the moving charges in the fluid stream gives rise to "ion slip," or a difference between the longitudinal velocities of the charges and the fluid carrying the charges. In general, mostly charged aerosol particles, because of their low mobility, reach the collector electrode 26, the ions and the remaining charged particles drifting to the boundary of the flow path and returning upstream to the attractor electrode 22 under the action of the axial and radial field. It can be seen from FIGURE 1 and the foregoing that sufficient potential at the collector electrode 26 for this purpose is attained without an external power supply by making the resistance of the circuit 30, 32 great enough so that the potential drop through the external circuit is large. The current $i$ indicated by the galvanometer 32 is then a function of the concentration of the charged aerosol particles, the charge on each particle, and the mobility of the charged aerosol particles.

It will be benefical at this point to examine in more detail the theory of operation of the basic device shown in FIGURE 1, with a view to developing some general expressions relating the current $i$ to the quantities of interest.

It has been shown in my co-pending application for "Precipitator Systems," Ser. No. 477,516, filed Aug. 5, 1965, now abandoned and assigned to the assignee of this invention, that the concentration $n_c$ of charged particles downstream of fluid ionization decreases as the length (L) between ionizing electrodes and a collector electrode is increased. This dependence of the charge concentration on the separation distance L is given by the following relation:

$$\frac{n_c(L)}{n_c(0)} = \frac{1}{1+L/\lambda} \qquad (1)$$

where $n_c$ (L) is the concentration of charged particles at the collector 26 at a distance L downstream of the ionizing electrodes 18, 22 and $n_c$ (O) is the initial concentration of charged particles leaving the ionizing corona field. In general, $n_c$ (O) will equal the actual concentration of particles at the inlet 12 where all of the particles are given sufficient time in the corona discharge to become completely charged. $\lambda$ is a parameter determined by the properties of the particles and the gas and is defined as:

$$\lambda = \frac{\epsilon_0 u}{eNn_c(0)K} \text{meters} \qquad (2)$$

where $\epsilon_0$ is the dielectric constant of free space, $u$ is the velocity of the fluid in the flow path, $e$ is the coulomb charge of one electron, N is the number of electronic charges carried by one particle, K is the mobility of the particles, and the coulomb charge $q$ per particle is $q=eN$. As a general rule $n_c(L)<n_c(O)$, owing to the neutralization of some of charged particles as they move to the boundary of the flow path under the influence of the radial space charge field, as mentioned above.

From inspection, we may write in an expression for the current $i$ reaching the collector electrode 26, assuming that all of the charge carrying particles have been neutralized at the collector. This expression is $$i = AeNn_c(L)u \text{ amps} \qquad (3)$$

where A is the cross-sectional area of the flow path. Combining expressions (1) and (3), we obtain:

$$i = \frac{\pi d^2}{4} eNn_c(0)u \left[\frac{1}{1+L/\lambda}\right] \qquad (4)$$

where $\pi d^2/4$ is the cross-sectional area of the cylindrical flow path in the collector 26. In this connection, it will be realized that although a cylindrical collector electrode may be preferred, other cross-sectional shapes may be employed. From Equation 4 it can be seen that the current $i$ is dependent upon the parameter $\lambda$, with respect to the length L, and the properties of the charged particles. The properties of the particles may, therefore, be determined by varying the length L of the dielectric generator section of the apparatus, and measuring current.

The mobility of the aerosol in the gas may be measured directly by imposing the condition $L/\lambda \gg 1$. Under this condition (from expression (4)):

$$i = \frac{\pi d^2}{4} \cdot \frac{\epsilon_0 u_2}{LK} \qquad (5)$$

The current indicated by the galvanometer 32 will therefore be inversely proportional to the aerosol mobility K.

Under the same conditions, i.e., $L/\lambda \gg 1$, the size of the particles suspended in the gas may be determined, since the formulas for the mobilities of sub-micron and super-micron particles have been derived and for convenience are given below. For sub-micron particles ($a<.2\mu$):

$$K \cong \frac{2}{3} \frac{\epsilon_0 kT}{\eta u} \ln\left[\frac{ae^2cn_i(0)x/u}{4\epsilon_0 kT}\right] \qquad (6)$$

and for super-micron particles ($a>1.0\mu$):

$$K \cong \frac{2\epsilon_0 aE_0}{\eta} \qquad (7)$$

where $a$ is the radius of the particle in meters, $k$ is Boltzmann's universal gas constant, $n_i(0)$ is the concentration of molecular ions in the ionizing corona discharge, T is the temperature in degrees Kelvin, $\eta$ is the viscosity of the carrier gas, $x$ is the longitudinal dimension of the ionizing corona field (see FIGURE 1) and $E_0$ is the ionizing field gradient. From the foregoing, it is observed that for sub-micron particles, the current $i$ is inversely proportional to the natural logarithm of particle radium $a$, while for super-micron particles, it is inversely proportional to $a$.

The FIGURE 1 apparatus may be calibrated to measure $a$ directly by introducing several aerosols of known size and recording the current indications on the galvanometer 32 with all other variables held constant. Under the condition $L/\lambda \gg 1$ the current $i$ is insensitive to the aerosol concentration $n_c(0)$, and thus the degree to which the gas is ionized or to which the particles are charged is unimportant for particle mobility or particle size measurements.

Measurement of initial aerosol concentration $n_c(0)$ can be accomplished by moving the collector electrode 26 closer to the ionizing electrodes 18, 22 such that $L/\lambda \ll 1$, but far enough away from the collector 26 so that molecular ions are not collected, i.e., $L/\lambda_i \gg 1$, where, $$\lambda_i = \frac{\epsilon_0 u}{n_i(0)K_i e} \qquad (8)$$

$K_i$ being the mobility of the molecular ions.

In most cases of interest, $\lambda_i \ll \lambda$; therefore, it is generally easy to satisfy the above conditions relating to the dimension L and the parameters.

From expression (4), the measured collector current $i$ becomes:

$$i = \frac{\pi d^2}{4} n_c(0) ueN \qquad (9)$$

where the saturated number of electronic charges per particle N in a long coaxial corona discharge is known to be:

$$\frac{N}{a<.2\mu} = \frac{4\pi\epsilon_0 akT}{e^2} \ln\left[\frac{ae^2cn_i(0)x/u}{4\epsilon_0 kT}\right] \qquad (10)$$

and $$N \cong \frac{12\pi\epsilon_0 a^2 E_0}{e}, \quad (a>1.0\mu) \qquad (11)$$

It is thus observed (expression (9)) that the collector current $i$ is directly proportional to the initial aerosol concentration $n_c(0)$. As seen in FIGURE 1, $x$ is the axial length of the attractor electrode and therefore the axial dimension of the corona discharge. The term $c$ in expression (10) is a constant defining the random thermal speed of molecules in the fluid. In general, it is desirable that the retention time of the particles in the corona discharge be long enough so that the particles attain charge saturation. This, as dictated by the above expressions, can be accomplished by correlating the flow velocity $u$ to the axial dimension $x$ of the attractor electrode and the strength of the ionizing field gradiant $E_0$.

It is now possible to derive expressions for the mass flow rate $\dot{m}_c$(kg./sec.) of the charged aerosol particles in the flow path in terms of the current $i$. This is:

$$i = \dot{m}_c \left(\frac{3\pi}{32} \frac{1}{a^3} \frac{eN}{\rho_0}\right) \qquad (12)$$

where $$\dot{m}_c = \rho_c \frac{32}{3} \pi a^3 n_c(0) u \frac{\pi d^2}{4} \qquad (13)$$

$\rho_c$ is the density of the aerosol particles in kg./m.³. Calibration of the electrogasdynamic aersol monitor can be accomplished by collecting the particles reaching the collector 26 in a bag filter or an electrogasdynamic precipitator such as the type described in the aforementioned copending application Ser. No. 477,516. The total collected particle mass M may then be accurately weighed and this quantity divided by the time during which collection occurred such that $\dot{m}_c = M/t$.

As an illustrative example, we may assume a fluid velocity $u$ in the flow path of about 1 meter/sec. for ease of computation, and a corona discharge current between the ionizing electrodes 18, 22 of approximately 25 $\mu$amps. Practical values for the diameter $d$ of the flow path and the axial dimension $x$ of the attractor electrode 22, are 5 mm. and 15 cm. respectively. Under these conditions the following values obtain relative to the ions produced in the ionizing field:

$n_i(0) = 10^{17}$ ions/m.³
$K_i = 2 \times 10^{-4}$ m.²/volt-sec.
$\lambda_i = 2.8 \times 10^{-6}$ meters With an aersol concentration of about $10^{15}$ particles/m.³, each particle having a typical radius of about $.1\mu$, the collector current $i$ measured $2 \times 10^{-8}$ amps in a laboratory model similar to the device shown in FIGURE 1. From Equation 10 $N=10$ electronic charges per particle, and from expression (6) the mobility of the particles may be initially determined. This is $K=1.3 \times 10^{-7}$ m.²/volt-sec. Substituting the above values in expression (2), we obtain $\lambda \cong 4.3 \times 10^{-2}$ meters. With the relevant parameter and variables thus initially determined, the position of the collector electrode 26 relative to the ionizing electrodes 18, 22 may be chosen. For mobility measurements, it will be recalled that the ratio $L/\lambda$ should be substantially greater than one, say $L/\lambda \geq 5$, or $L \geq .215$ meters.

To obtain indications of, for example, the initial aersol concentration $n_c(0)$, the length L will be chosen such that $L/\lambda \ll 1$, say $L/\lambda \leq .2$; L will then be about $.86\times10^{-2}$ meters, or .86 cm. It will be noticed that $\lambda_1<<\lambda$, as required for the measurement of aerosol concentration.

As a further example, we may determine the properties of super-micron particles having a radial dimension of, e.g., about 10$\mu$. A typical concentration $n_c(0)$ for particles of this size is $10^9$ particles/m.$^3$. With $u=1$ m./sec., as before, the following values may be derived:

$N=10^4$ charges/particle
$K=5\times10^{-6}$ m.$^2$/volt-sec.
$\lambda=1$ meter
$i=2\times10^{-11}$ amp $\quad(L/\lambda<<1)$ If desired, a conventional electrometer may be substituted for the galvanometer 32 (FIGURE 1) where, as above, the expected current is an order of magnitude below 1 $\mu$amp.

Having once determined the length L of the generator section over which the axial electric field acts, it is possible to calibrate the current $i$ for the measurement of the properties of all aerosols which satisfy the foregoing relationships between L and $\lambda$.

From Equations 5 and 9, expressing the relationship between the current $i$ and K and $n_c(O)$, respectively, it is seen that a high degree of reliability and accuracy may be realized by carefully regulating or monitoring the fluid velocity $u$. With proper design of the ionizing electrodes, as explained above, it is fundamentally easy to assure that each particle obtains its saturated charge $e$N in the ionizing field and thereby to ensure consistency in the measurement of particle concentration $n_c(O)$.

From the preceding, it will be appreciated that the axial adjustability of the collector electrode 26 permits the adaptation of the apparatus to measurement of all the properties of the aerosol particle. Regardless of the particular property being monitored, however, the length L of the generator section will preferably bear a specific relationship to the parameter $\lambda$.

Referring now to FIGURES 3 and 4, there is shown a further form of collector section which may be used for measuraments in accordance with the invention. In this embodiment, the flow path channel is expanded in a divergent nozzle section 40 downstream of the dielectric portion of the conduit 10 over which the axial field acts. A collector electrode 42 in the form of a tapered element diverging in the direction of axial flow is supported in the flow path by arms 43 fastened by suitable means to the wall 44 of the channel. As before, the particles entrained in the fluid are charged upon passage through the corona field between the attractor and corona electrodes 22, 18. For purposes of illustration, the power supply connections to the ionizing electrodes 18, 22 are reversed relative to the connections shown in FIGURE 1, so that the particles become negatively charged.

As the charged particles 27 flow downstream and reach the vicinity of the collector 42, a radial space charge field within the channel is set up and induces a corona discharge from the point 42*a* of the collector electrode 42. This discharge or emission contains charges of a polarity opposite to the charge on the particles and neutralizes the charges of the particles 27 flowing axially past the tip 42*a* of the collector electrode and into the divergent section 40. The expansion of the flow path by the nozzle slows the charged particles 27 in the collecting region and thereby enhances the probability of particle neutralization in any given axial zone of the flow channel. The galvanometer 32 is connected, as previously, to the collector electrode 42 so that the indication $i$ on the galvonometer represents the rate at which the charges are neutralized by the collector electrode 42.

The construction of the electrogasdynamic monitor shown in FIGURES 3 and 4 has the additional advantage of presenting a conductive surface 42*b* to the direct flow of charged particles in the flow path. In this manner, charged particles of low mobility and having a sufficient axial velocity impinge the surface 42*b* of the collector electrode and are discharged or neutralized upon contact therewith. For particles of low mobility and relatively high velocity, the collection or neutralization of the particle changes may be accomplished efficiently in an axial distance shorter than the axial dimension of the collector shown in FIGURE 1. This is due to the deceleration of the fluid in the divergent nozzle 40, coupled with the charge neutralization by impingement of particles directly on the collecting surface 42*b*.

FIGURE 5 shows a further collector configuration for the basic apparatus shown in FIGURE 1. As seen in FIGURE 5 the cross-sectional area of the flow path is expanded in the diverging nozzle section 45 downstream of the ionizing electrodes 18, 22 to increase the cross-sectional area of the flow path. Since the particle concentration $n_c(L)$ at the cylindrical collector electrode 46 is constant, an expansion of the volume defined by the collector electrode results in an increase in the strength of the radial space charge field. The combined effects of the diminished particle velocity and the stronger radial field ensures that the charges carried by the particles in the collector section 46 will be efficiently neutralized.

It should be noted that in FIGURES 3–5, the position of the collector electrode may be made variable relative to the position of the ionizing electrodes 18, 22, so that the apparatus may be adapted to the measurement of both particle size and mobility, as well as mass flow and concentration. This may be accomplished in any suitable manner, such as, for example, by constructing the collector and divergent nozzle portions so that they are together slidably supported by the upstream portion of the apparatus including the ionizing and generator sections.

From the foregoing, it is apparent that the invention provides improved methods and apparatus for measuring the properties of particulate matter suspended in gases, which are completely free from the disadvantages of the prior art. Moreover, because of the relative physical simplicity of the apparatus, it may be employed to measure all, rather than only some, of the properties of the aerosol. Apparatus constructed in accordance with the present invention, are additionally, inexpensive to maintain and manufacture, and reliable in their operation owing to the simplicity of construction and operating principles.

Although the invention has been described with reference to specific embodiments thereof, it is understood that substitutions, modifications and variations, both in form and detail, will occur to those skilled in the art. All such substitutions, modifications and variations, therefore are intended to be included wtihin the scope of the invention as defined in the appended claims.

I claim:

1. A method for determining the properties of particles entrained in an ionizable gas, comprising the steps of:

flowing the gas through a bounded flow path;

exposing the gas in the flow path to an electrical discharge at an upstream portion of the flow path to charge the particles to a given electrical polarity and thereby to produce a radial space charge field downstream of the electrical discharge;

applying an axial electric field in a section of the bounded flow path downstream of such discharge having a polarity productive of ion slip in the flow path, the field having a magnitude sufficient to prevent substantially ions having the same polarity or the polarity of charged particles from flowing downstream of said section;

collecting the charges associated with the particles moving to the boundary of the flow path under the effect of the space charge field downstream of the axial electric field; and obtaining an indication of the rate at which the particle charge is collected.

2. A method in accordance with claim 1, in which:
the peripheral dimension of the flow path boundary in said section increases in the axial electric field.

3. A method in accordance with claim 1, further comprising the step of:
decreasing the axial velocity of the gas flow downstream of the electrical discharge.

4. A method in accordance with claim 1, in which:
charging of the particles is accomplished by subjecting the gas in the flow path to a corona discharge field; and
the duration in the discharge field of the particles entrained in the gas is sufficient to cause charge saturation of the particles.

5. A method for determining the properties of particles entrained in an ionizable gas, comprising the steps of:
flowing the gas through a bounded flow path;
subjecting the gas in the flow path to an electrical discharge at an upstream portion of the path to charge the particles to a given electrical polarity and thereby produce a radial space charge field downstream of the electrical discharge, the gas and charged entrained particles having associated therewith a parameter $\lambda$ given by the relation $\lambda = \epsilon_0 u / e N n_c(0) K$, where $\epsilon_0$ is the dielectric constant of free space, $u$ is the axial velocity of the gas, $e$ is the coulomb charge of an electron, $n_c(0)$ is the charged particle concentration, N is the number of electronic charges per particle and K is the mobility of the particles;
applying an axial electric field over an axial distance L of the flow path such that the ratio $L/\lambda$ is substantially greater than 1, the axial electric field being productive of ion slip in the flow path;
collecting the charge associated with the particles moving to the boundary of the flow path under effect of the space charge field downstream of the axial electric field; and
obtaining an indication of the rate at which the particle charge is collected, such rate being inversely related to the mobility of the charged particles.

6. A method for determining the properties of particles entrained in an ionizable gas, comprising the steps of:
flowing the gas through a bounded flow path;
subjecting the gas in the flow path to an electrical discharge at an upstream portion of the path to charge the particles to a given electrical polarity and thereby produce a radial space charge field downstream of the electrical discharge, the gas and charged entrained particles having associated therewith a parameter $\lambda$ given by the relation $\lambda = \epsilon_0 u / e N n_c(0) K$, where $\epsilon_0$ is the dielectric constant of free space, $u$ is the axial velocity of the gas, $e$ is the coulomb charge of an electron, $n_c(0)$ is the charged particle concentration, N is the number of electronic charges per particle and K is the mobility of the particles;
applying an axial electric field over an axial distance L of the flow path such that the ratio $L/\lambda$ is substantially less than 1, the axial electric field being productive of ion slip in the flow path;
collecting the charge associated with the particles moving to the boundary of the flow path under effect of the space charge field downstream of the axial electric field; and
obtaining an indication of the rate at which the particle charge is collected, such rate being proportional to the particle concentration $n_c(0)$.

7. A method as defined in claim 6 wherein:
the ions of the ionized fluid have associated therewith a parameter $\lambda_i$ given by the relation $\lambda_i = \epsilon_0 u / N_i(0) K_i e$ where $u$ is the velocity of the fluid, $n_i(0)$ is the ion concentration and $K_i$ is the mobility of the ions; and
the ratio $L/\lambda_i$ is substantially greater than 1,
whereby the collected charge carried by the ions is substantially less than the collected charge associated with the particles.

8. A method in accordance with claim 7, further comprising the step of:
measuring the mass rate of particle flow through the path; and
correlating the mass rate of particle flow to the rate at which the particle charge is collected.

9. A method for determining the mobility concentration of particles entrained in an ionizable gas, comprising the steps of:
flowing the gas through a bounded flow path;
ionizing the gas at an upstream portion of the flow path to charge the particles to a given electrical polarity and thereby to produce a radial space charge field downstream of the ionization;
subjecting the ionized gas to an axial ion-repelling field in an intermediate portion of the flow path, such field having a polarity and magnitude sufficient substantially to prevent the flow of ions having the same polarity as the polarity of the particles from flowing downstream out of the intermediate portion;
neutralizing the charges associated with the particles downstream of the ion-repelling field with an emission of charges having a polarity opposite to the polarity of the charges carried by the particles; and
measuring the rate at which the neutralizing charges are emitted.

10. A method as defined in claim 9, in which:
at least some of the charges associated with the particles are neutralized by locating a conductive surface in the flow path to be impined by the charged particles having a velocity component in a direction parallel to the axis of the flow.

11. Apparatus for determining the properties of particles entrained in a stream of ionizable fluid, comprising:
means defining a dielectric flow path boundary surrounding the fluid;
means for establishing an electrical discharge in the flow path upstream of the dielectric means to charge the particles and to thereby produce a radial space charge field in the flow path downstream of the electrical discharge means;
a collector section including conductive means for collecting the charges associated with particles moving to the boundary of the flow path under the effect of the space charge field downstream of the axial electric field; and
means electrically connected to the conductive means for obtaining an indication of the rate at which the charges carried by the particles are collected and, in conjunction with the dielectric means, for maintaining over at least a portion of the axial dimension of the dielectric means an axial ion-repelling field of sufficient magnitude to prevent substantially a flow into the collector section of ions of the polarity of the charged particles.

12. Apparatus in accordance with claim 11, in which:
the cross-sectional area of the flow path in the axial field is less than the cross-sectional area of the flow path in the collector section.

13. Apparatus for determining the properties of particles entrained in a stream of ionizable fluid, comprising:
- means defining a dielectric flow path boundary surrounding the fluid;
- means for establishing an electrical discharge in the flow path upstream of the dielectric means to charge the particles and to thereby produce a space charge field in the flow path downstream of the electrical discharge, the fluid and entrained particles having associated therewith a parameter $\lambda$ given by the relation of $\lambda = \epsilon_0 u / e n_c(O) K N$, where $\epsilon_0$ is the dielectric constant of free space, $u$ is the axial velocity of the particles, $e$ is the coulomb charge of an electron, $n_c(O)$ is the particle concentration, N is the number of electronic charges per particle, and K is the mobility of the particles, the dielectric means being effective to maintain an axial electric field productive of ion slip downstream of the electrical discharge means over a length L such that the ratio $L/\lambda$ is substantially greater than 1;
- a collector section including means for collecting the charges associated with the particles moving to the boundary of the flow path under the effect of the space charge field downstream of the axial electric field; and
- means for obtaining an indication of the rate at which the charges by the particles are collected, such rate being inversely related to the mobility of the charged particles.

14. Apparatus for determining the properties of particles entrained in a stream of ionizable fluid, comprising:
- means defining a dielectric flow path boundary surrounding the fluid;
- means for establishing an electrical discharge in the flow path upstream of the dielectric means to charge the particles and to thereby produce a space charge field in the flow path downstream of the electrical discharge, the fluid and entrained particles having associated therewith a parameter $\lambda$ given by the relation $\lambda = \epsilon_0 u / e N n_c(O) K$, where $\epsilon_0$ is the dielectric constant of free space, $u$ is the axial velocity of the particles, $e$ is the coulomb charge of an electron, $n_c(O)$ is the particle concentrate, N is the number of electronic charges per particle, and K is the mobility of the particles, the dielectric means being effective to maintain an axial electric field productive of ion slip downstream of the electrical discharge means over a length L such that the ratio $L/\lambda$ is substantially less than 1;
- a collector section including means for collecting the charges associated with the particles moving to the boundary of the flow path under the effect of the space charge field downstream of the axial electric field; and
- means for obtaining an indication of the rate at which the charges carried by the particles are collected, such rate being proportional to the concentration $n_c(O)$ of the particles entrained in the fluid.

15. Apparatus as set forth in claim 14, wherein:
- the ions of the ionized fluid have associated therewith a parameter $\lambda_i$ given by the relation $\lambda_i = \epsilon_0 u / e n_i(O) K_i$ where $\epsilon_0$ is the dielectric constant of free space, $e$ is the coulomb charge of an electron, $u$ is the velocity of the ions in the fluid, $n_i(O)$ is the ion concentration and $K_i$ is the mobility of the ions; and
- the ratio $L/\lambda_i$ is substantially greater than 1,
- whereby the collected charge carried by the ions is substantially less than the collected charge associated with the particles.

16. Apparatus for determining the properties of particles entrained in a stream of ionizable fluid, comprising:
- means defining a flow path boundary for the fluid;
- means for ionizing the fluid at an upstream portion of the flow path boundary means to charge the particles and to thereby produce a radial space charge field in the flow path downstream of the ionizing means;
- means for creating an axial electric field productive of ion slip downstream of the ionizing means;
- a collector section including means for collecting the charges associated with the particles moving to the boundary of the flow path under the effect of the space charge field downstream of the axial electric field, the axial position of the collecting means relative to the ionizing means being adjustable; and
- means for obtaining an indication of the rate at which the charges carried by the particles are collected.

17. Apparatus for determining the properties of particles entrained in a stream of ionizable fluid, comprising:
- means defining a flow path boundary for the fluid;
- means for ionizing the fluid at an upstream portion of the flow path boundary means to charge the particles and to thereby produce a radial space charge field in the flow path downstream of the ionizing means;
- means for creating an axial electric field productive of ion slip downstream of the ionizing means;
- a collector section comprising a tube having an inner conductive surface exposed to the flow path downstream of the axial field for collecting charges associated with the particles moving to the boundary of the flow path under the effect of the space charge field, the tube being disposed for slidable axial movement relative to the means defining the flow path boundary.

18. Apparatus for determining the properties of particles entrained in a stream of ionizable fluid, comprising:
- means defining a flow path boundary for the fluid;
- means for ionizing the fluid at an upstream portion of the flow path boundry means to charge the particles to a given electrical polarity and to thereby produce a radial space charge field downstream of the ionizing means;
- means for creating an axial field productive of ion slip downstream of the ionizing means and having a polarity and magnitude sufficient to prevent substantially a flow downstream of the axial field of ions having the same polarity as the charge carried by the particles;
- a collector section including conductive means exposed to the flow path and effective to emit charges having a polarity opposite to the polarity of the charges carried by the particles for neutralizing the particle charges; and
- indicating means connected in circuit with the collector section conductive means for indicating the rate at which the charges carried by the particles are neutralized.

19. Apparatus as defined in claim 18, in which:
- the conductive means defines a pointed tapered element disposed in the flow path and diverging in the direction of fluid flow,
- whereby the space charge field adjacent the element is effective to cause a corona discharge from the point thereof.

20. Apparatus as defined in claim 18, in which:
- the conductive means includes a conductive surface disposed in the flow path to be impinged by charged particles having a velocity component parallel to the direction of fluid flow.

21. Apparatus in accordance with claim 18, in which:
- charge emission from the conductive means is induced by the radial space charge field created by the charged particles adjacent the conductive means.

22. An electrogasdynamic method for determining the properties of particles entrained in a stream of gas, comprising:
- exposing the entrained particles to a corona discharge in the stream to produce ions and charge the particles to a given electrical polarity;

passing the stream containing the charged particles through a dielectric conduit;

neutralizing the charges carried by the particles at a conductive surface in a collecting region downstream of the dielectric conduit;

maintaining in the dielectric conduit an axial electric field having a polarity and magnitude sufficient substantially to restrict the downstream velocity of ions and free charges of the same polarity as the charged particles; and obtaining a manifestation of the rate at which the charged particles are neutralized at the conductive surface.

23. A method as defined in claim 22, in which:
the conductive surface defines a lateral boundary for the stream in the collecting region, and
neutralization occurs solely by the reaction of the charged particles with a lateral space charge field resulting from the presence of such charges entrained in the flow within the collecting region.

24. A method as set forth in claim 22, in which:
the conductive surface is formed to produce ions of a polarity opposite to the polarity of the charge carried by the particles in the presence of a sufficient electrical field terminating thereat, and
the space charge created by the charged particles is maintained at a sufficient value adjacent the conductive surface to produce such opposite polarity ions, thereby to neutralize at least some of the charge carried by the particles.

25. Apparatus for determinging the properties of particles entrained in a gas stream, comprising:
means for subjecting the stream to an electrical discharge for charging the particles to a given electrical polarity;
a dielectric conduit disposed to receive the stream containing the charged particles and forming at the downstream end thereof a divergent opening;
a conductive collector element exposed to the stream exiting from the convergent opening of the dielectric conduit to neutralize the charges carried by the particles; and
electrical indicating means connected to the conductive collector element and providing a current path for current neutralizing the particle charges.

26. Apparatus according to claim 25, in which:
the conductive collector element includes a surface tapering to an apex in the upstream direction and located longitudinally in respect to the divergent opening to form therewith an annular divergent exit for the stream.

27. Apparatus as defined in claim 25, in which:
the dielectric conduit has an area of cross-section normal to the stream that is substantially constant between the divergent opening and the electrical dicharge means.

28. Apparatus for determining the properties of particles entrained in a stream of gas, comprising:
a conduit having a dielectric interior surface defining a flow path for the stream;
an annular attractor electrode disposed adjacent the dielectric surface at an upstream end of the conduit;
an elongated corona discharge electrode and extending coaxially through the attractor electorde and having a charge emitting tip disposed downstream of the attractor electrode to establish a corona discharge thereto by which the particles in the stream are charged;
a conductive collector surface exposed to the charged particles downstream of the dielectric surface for neutralizing the charges carried by the particles and moving closely adjacent thereto; and
indicating circiut means electrically connected to the conductive collector surface for obtaining a manifestation of the rate at which the partices charges are neutralized and for maintaining the potential of the surface at a value and polarity productive of ion slip over the longitudinal zone defined by the dielectric surface.

29. Apparatus according to claim 28, in which:
a portion of the dielectric surface upstream of the attractor electrode defines an entrance for the stream convergent in the downstream direction.

30. Apparatus according to claim 28, in which:
the conductive surface is movably supported for modifying the effective axial distance between such surface and one of the corona and attractor electrodes.

References Cited

UNITED STATES PATENTS 2,932,966   4/1960   Grindell.
3,114,877   12/1963   Dunham _____ 324—33 XR
3,379,968   4/1968   Yamane _____ 324—33

RUDOLPH V. ROLINEC, *Primary Examiner.*

C. F. ROBERTS, *Assistant Examiner.*

U.S Cl. X.R.

73—194; 340—237; 324—33, 32

UNITED STATES PATENT OFFICE
CERTIFICATE OF CORRECTION

Patent No. 3,449,667                                      June 10, 1969

Meredith C. Gourdine

It is certified that error appears in the above identified patent and that said Letters Patent are hereby corrected as shown below:

Column 1, line 63, "paticle" should read -- particle --. Column 4, line 15, "charge" should read -- charged --; line 61, after the equation insert a comma; lines 65 and 67, and Column 5, line 6, "$n_c(O)$", each occurrence, should read -- $n_c(0)$ --. same column 5, line 26, "Equation" should read -- equation --; line 34 "$L/2 \gg 1$" should read -- $L/\lambda \gg 1$ --; line 49, $$K \cong \frac{2}{3} \frac{\epsilon_o kT}{\eta u} \quad \text{should read} \quad K \cong \frac{2}{3} \frac{\epsilon_o kT}{\eta e}$$

line 57, "$n_i(O)$" should read -- $n_i(0)$ --. Column 7, lines 40 and 47, "$n_c(O)$" should read -- $n_c(0)$ --; same column 7, line 14, "aersol" should read -- aerosol --. Column 8, line 66, "wtihin" should read -- within --. Column 10, line 46, "impined" should read -- impinged --. Column 13, line 33, "determinging" should read -- determining --. Column 14, line 15, "electorde" should read -- electrode --; line 24, "circiut" should read -- circuit --; line 26, "partices" should read -- particle --.

Signed and sealed this 19th day of May 1970.

(SEAL)
Attest:

EDWARD M. FLETCHER, JR.
Attesting Officer

WILLIAM E. SCHUYLER, JR.
Commissioner of Patents